(12) United States Patent
Lee

(10) Patent No.: US 6,326,744 B1
(45) Date of Patent: Dec. 4, 2001

(54) DYNAMIC FOCUSING CIRCUIT OF A MONITOR SYSTEM

(75) Inventor: Sang-Young Lee, Suwon (KR)

(73) Assignee: SamSung Electronics Co., Ltd., Suwong (KR)

( * ) Notice: Subject to any disclaimer, the term of this patent is extended or adjusted under 35 U.S.C. 154(b) by 0 days.

(21) Appl. No.: 09/374,268

(22) Filed: Aug. 16, 1999

(30) Foreign Application Priority Data

Aug. 25, 1998 (KR) .................................................. 98-34445

(51) Int. Cl.$^7$ ....................................................... G09G 1/04
(52) U.S. Cl. ............................................. 315/382; 315/403
(58) Field of Search ................................... 315/382, 403, 315/405, 406, 1, 5.34, 245

(56) References Cited

U.S. PATENT DOCUMENTS

| | | | |
|---|---|---|---|
| 4,916,365 | * 4/1990 | Arai | 315/383 |
| 5,428,270 | * 6/1995 | Infante | 315/382 |
| 5,512,964 | * 4/1996 | Kim | 348/806 |
| 5,532,558 | * 7/1996 | George | 315/382.1 |
| 5,705,900 | * 1/1998 | Hwang | 315/382 |
| 5,831,400 | * 11/1998 | Kim | 315/382.1 |
| 5,886,482 | * 3/1999 | Watanabe et al. | 315/382 |
| 5,942,861 | * 8/1999 | Bang | 315/382 |
| 5,977,728 | * 11/1999 | Kwon | 315/382 |
| 6,078,151 | * 6/2000 | Kudo | 315/382 |

* cited by examiner

Primary Examiner—Don Wong
Assistant Examiner—Trinh Vo Dinh
(74) Attorney, Agent, or Firm—Robert E. Bushnell, Esq.

(57) ABSTRACT

A dynamic focusing circuit of a monitor system capable of easily compensating a defocusing of a screen which often occurs in the monitor system which adopts a CRT. When vertical and horizontal parabolic signals is output from oscillation signal generating section, first and second amplifying sections amplify the vertical and horizontal parabolic signals, respectively, and output vertical and horizontal parabolic amplification signals, respectively. Signal mixing section mixes the vertical and horizontal parabolic amplification signals respectively output from the first and second amplifying section to apply a dynamic focusing signal to a focusing electrode. Accordingly, delay and distortion of the signal caused by the stray-capacitance of the transformer does not occur. Also, the waveform of the dynamic focusing signal is stably maintained even though the user changes a vertical or a horizontal size of the screen of the monitor system. As a result, it is able to easily and correctly compensate the defocusing of the video displayed on the CRT.

22 Claims, 2 Drawing Sheets

DYNAMIC FOCUSING CIRCUIT OF A MONITOR SYSTEM

CLAIM OF PRIORITY

This application makes reference to, incorporates the same herein, and claims all benefits accruing under 35 U.S.C §119 from an application entitled Dynamic Focusing Circuit Of A Monitor earlier filed in the Korean Industrial Property Office on Aug. 25, 1998, and there duly assigned Ser. No. 98-34445 by that Office.

BACKGROUND OF THE INVENTION

1. Field of the Invention

The present invention relates to a monitor system, and more particularly, to a dynamic focusing circuit of a monitor system for effectively compensating a defocusing of a screen which often occurs in the monitor system which adopts a cathode-ray tube (hereinafter, refer red to as "CRT").

2. Description of the Prior Art

In general, the CRT of the monitor system has an electron gun for emitting an electron beam, an anode for accelerating the electron beam emitted from the electron gun to be moved to the front of the CRT, a deflecting yoke (hereinafter, referred to as "DY") for deflecting the accelerated electron beam to determine a moving direction of the electron beam, a negative electrode for emitting hot electrons in response to a red-green-blue video signal (hereinafter, referred to as "RGB video signal") input to the CRT and grids for supplying the hot electrons emitted from the negative electrode to a fluorescent screen as the electron beam. At this time, luminescent materials corresponding to the each of the red, green and blue colors are regularly arranged on the fluorescent screen. The video displayed on the CRT is formed by light generated by means of colliding the electron beam passed the grids with the luminescent materials arranged on the fluorescent screen.

However, the more a deflecting angle, according to the DY, enlarges, the more a diameter of the electron beam of the CRT enlarges in general. That is, the more the electron beam becomes distant from the center of the fluorescent screen, the more the diameter of the electron beam which collides with the luminescent materials enlarges. Accordingly, the focusing depth of the video displayed on the screen decreases. To prevent the focusing depth from decreasing, a method which adopts a dynamic focusing circuit for stably supplying a voltage applied to the grid corresponding to a focusing electrode among the grids has been disclosed.

However, such dynamic focusing circuit can not correctly compensate the defocusing due to delay and distortion of the signal caused by a stray capacitance of a transfomer. Also, in a case where a user changes vertical or horizontal size of the screen of the monitor system, it is not able to compensate the defocusing because waveforms of vertical and horizontal parabolic signals applied to the dynamic focusing circuit are changed.

SUMMARY OF THE INVENTION

Therefore, it is an object of the present invention to provide a dynamic focusing circuit of a monitor system for effectively compensating a defocusing of a screen which often occurs in the monitor system which adopts a CRT.

In order to achieve the above object, the present invention provides a dynamic focusing circuit of a monitor system, which comprises: oscillation signal generating means for generating horizontal and vertical parabolic signals in response to a reference oscillation signal applied from an outside; first amplifying means for amplifying the horizontal parabolic signal from the oscillation signal generating means and outputting a first amplification signal; second amplifying means for amplifying the vertical parabolic signal from the oscillation signal generating means and outputting a second amplification signal; and signal mixing means for mixing the first and second amplification signals and outputting a dynamic focusing signal.

In the dynamic focusing system of the monitor system according to the present invention, the vertical and horizontal parabolic signals are amplified by the amplifying sections of the dynamic focusing circuit section, respectively. The vertical and horizontal parabolic signals amplified by the amplifying sections are mixed by the transformer and are applied to the grid. Accordingly, delay and distortion of the signal caused by the stray-capacitance of the transformer does not occur. Also, the waveform of the dynamic focusing signal is stably maintained even though the user changes a vertical or a horizontal size of the screen of the monitor system. As a result, it is able to easily and correctly compensate for any defocusing of the video displayed on the CRT.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

A description will be given below in detail with reference to the accompanying drawings to a configuration and an operation of a dynamic focusing circuit of a monitor system according to an embodiment of the present invention.

Figure 1:
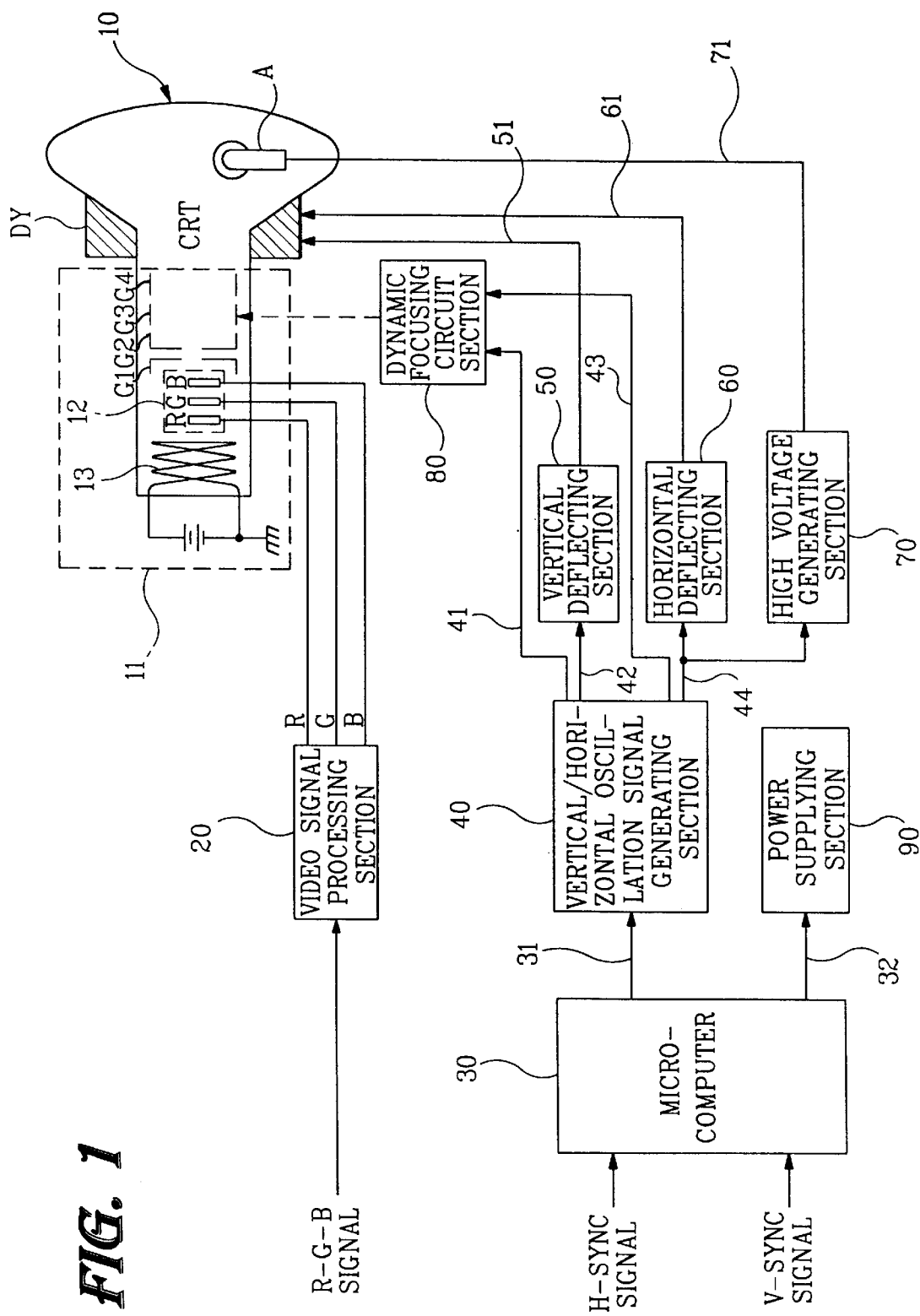
FIG. 1 is a block diagram showing the configuration of a dynamic focusing circuit of a monitor system according to a preferred embodiment the present invention.

Referring to FIG. 1, the monitor system has a CRT 10 or displaying a video. CRT 10 has an electron gun 11 for emitting an electron beam, an anode A for accelerating the electron beam from electron gun 11 to the front of CRT 10 and a deflecting yoke DY for deflecting the electron beam to determine a moving direction of the electron beam.

Electron gun 11 has a negative electrode 12 for emitting hot electrons in response to a RGB video signal input to CRT 10, a heater 13 for supplying heat energy to negative electrode 12 and grids G1, G2, G3 and G4 for supplying the hot electron emitted from negative electrode 12 to a fluorescent screen as the electron beam. At this time, luminescent materials corresponding to the each of the colors R, G and B are regularly arranged on the fluorescent screen. The video displayed on the CRT 10 is formed by light generated by means of colliding the electron beam passed grids by G1, G2, G3 and G4 with the luminescent materials arranged on the fluorescent screen.

Also, the monitor system has a video signal processing section 20 for amplifying the RGB video signal supplied from a video card (not shown) of a computer system to output separated R, G and B components to negative electrode 12, a microcomputer 30 for outputting a reference oscillation signal 31 in response to horizontal and vertical sync signals H_SYNC and V_SYNC, a vertical and horizontal (hereinafter, referred to as "V/H") oscillation signal generating section 40 for outputting vertical and horizontal parabolic signals 41 and 43, vertical and horizontal oscillation signals 42 and 44 in response to reference oscillation signal 31, a vertical deflecting section 50 for generating a vertical sawtooth signal 51 in response to vertical oscillation signal 42 and supplying vertical sawtooth signal 51 to a vertical deflecting yoke, a horizontal deflecting section 60 for generating a horizontal sawtooth signal 61 in response to horizontal oscillation signal 44 and supplying horizontal sawtooth signal 61 to a horizontal deflecting yoke, a high voltage generating section 70 for generating a high voltage signal 71 and supplying high voltage signal 71 to an anode A in response to horizontal oscillation signal 44, a dynamic focusing circuit section 80 for respectively amplifying vertical and horizontal parabolic signals 41 and 43 supplied from V/H oscillation signal generating section 40 and mixing vertical parabolic signal 41 and horizontal parabolic signal 43 to supply a dynamic focusing signal to third grid G3, and a power supplying section 90 for supplying a driving power source to each of elements of the monitor system in response to a control signal 32 from microcomputer 30.

Hereinafter, video display steps of the monitor system as described above are illustrated in detail. First, if the R, G and B video signal components amplified by video signal processing section 20 are applied to corresponding negative R, G and B electrodes of negative electrode 12, the hot electrons are emitted from a surface the corresponding negative R, G and B electrodes of negative electrode 12 heated by the heat energy from heater 13.

The hot electrons emitted from negative electrode 12 are transferred through a hole between first and second grids G1 and G2 and are focused by a pre-focusing lens (not shown) between second and third grids G2 and G3. The electron beam focused by the pre-focusing lens is changed to a more microscopic electron beam by a main-lens (not shown) between third and fourth grids G3 and G4. The electron beam passed by the main-lens is deflected in vertical and horizontal directions due to deflecting force of deflecting yoke DY and reaches the fluorescent screen due to an accelerating force generated from anode A. At this time, a focusing state of the electron beam, that is, the focus of the electron beam can be variably controlled by a voltage value applied to third grid G3.

Figure 2:
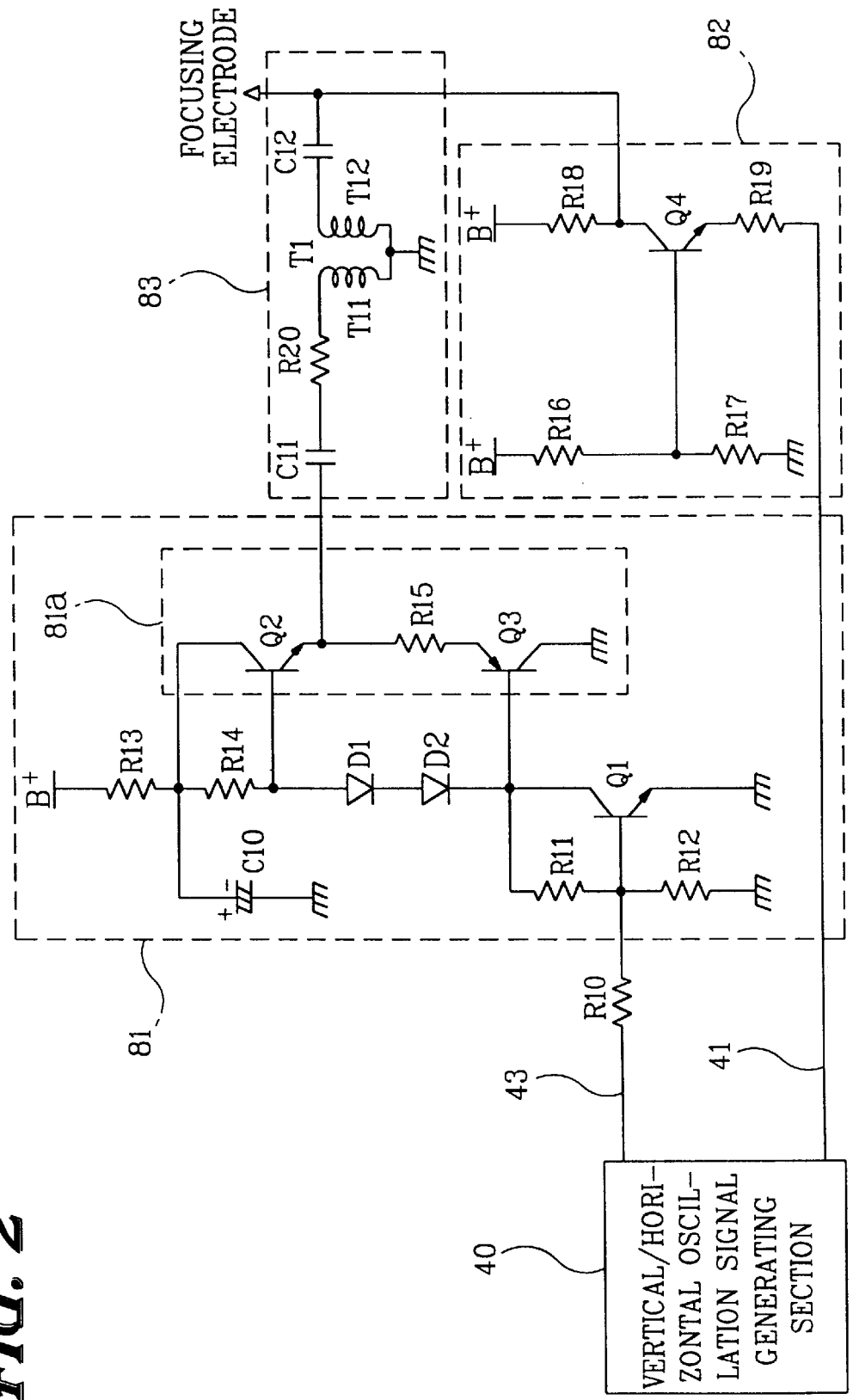
FIG. 2 is a circuit diagram showing the configuration of a dynamic focusing circuit section shown in FIG. 1.

Referring to FIG. 2, dynamic focusing circuit section 80 has a first amplifying section 81 for amplifying horizontal parabolic signal 43 from V/H oscillation signal generating section 40 and outputting a horizontal parabolic amplification signal, a second amplifying section 82 for amplifying vertical parabolic signal 41 from V/H oscillation signal generating section 40 and outputting a vertical parabolic amplification signal and a signal mixing section 83 for mixing the horizontal and vertical parabolic amplification signals to output the dynamic focusing signal applied to third grid G3.

First amplifying section 81 has a first amplifier Q1, a push-pull amplifier 81 a dependently connected to first amplifier Q1, bias resistors R11 and R12 of first amplifier Q1, bias resistors R13 and R14 of push-pull amplifier 81a, a smoothing capacitor C10 and diodes D1 and D2. Also, push-pull amplifier 81a has second and third amplifiers Q2 and Q3 and second amplifier Q2 is symmetrically coupled with third amplifier Q3.

At this time, first and second amplifiers Q1 and Q2 are a NPN type transistor and third amplifier Q3 is a PNP transistor, respectively. Additionally, collector terminals of second and third amplifiers Q2 and Q3 of push-pull amplifier 81a are connected to a ground.

First amplifier Q1 is biased by bias resistors R11 and R12 respectively connected with the collector and base terminals thereof, and second amplifier Q2 is biased by bias resistors R13 and R14 respectively connected with the collector and base terminals thereof.

First and second amplifier Q2 and Q2 adopt a driving power source $B^+$ supplied from power supplying section 90 to dynamic focusing circuit section 80 as a bias voltage. An amplifying efficiency of first amplifier Q1 and push-pull amplifier 81a is determined by means of the bias voltage and characteristics of the respective transistors.

The collector terminal of second amplifier Q2 is grounded through smoothing capacitor C10, and driving power source $B^+$ of which a voltage is dropped by bias resistors R13 and R14 of second amplifier Q2 is applied to bias resistors R11 and R12 of first amplifier Q1 through diodes D1 and D2.

Second amplifying section 82 has bias resistors R16, R17 and R18 of a fourth amplifier Q4 of a NPN type transistor of which a base terminal thereof is grounded via resistor R17, and has a resistor R19.

Signal mixing section 83 has a transformer T1, a first coupling capacitor C11 and a resistor 20 connected between an output terminal of the horizontal parabolic amplification signal of first amplifying section 81 and a primary coil T11 of transformer T1 in series and a second coupling capacitor C12 connected between an output terminal of the vertical parabolic amplification signal of second amplifying section 82 and a second coil T12 of transformer T1. At this time, first and second coupling capacitors C11 and C12 filter a direct-current component of the horizontal parabolic amplification signal output from first amplifying section 81.

Hereinafter, an operation of the dynamic focusing circuit section 80 as described above is illustrated in detail. Horizontal parabolic signal 43 generated from V/H oscillation signal generating section 40 is applied to the base terminal of first amplifier Q1 through an input resistor R10 of first amplifier Q1 for amplification by first amplifier Q1 for output to the collector terminal of first amplifier Q1 and is then applied to the base terminal of third amplifier Q3 of push-pull amplifier 81a to drive push-pull amplifier 81 a.

When the amplified horizontal parabolic signal is applied to the base terminal of third amplifier Q3 it amplified according to a signal amplifying efficiency of third amplifier Q3 and is output to the emitter terminal of third amplifier Q3.

The base terminal of second amplifier Q2 receives driving power source $B^+$ divided by bias resistors R13 and R14 thereof. The divided driving power source $B^-$ is amplified to a predetermined level according to a signal amplifying efficiency of second amplifier Q2 and the amplified signal which is amplified by second amplifier Q2 is output through the emitter terminal of second amplifier Q2.

The horizontal parabolic signal amplified and output by third amplifier Q3 is mixed with the amplified signal which is output from the emitter terminal of second amplifier Q2 through resistor R15. The mixed signal is applied to first coupling capacitor C11 as the horizontal parabolic amplification signal.

First coupling capacitor C11 filters the direct-current component of the horizontal parabolic amplification signal from first amplifying section 81. The horizontal parabolic amplification signal of which the direct-current component is filtered by first coupling capacitor C11 is applied to primary coil T11 of transformer T1 through resistor 20.

Transformer T1 transforms the horizontal parabolic amplification signal applied to primary coil T11 according to a winding ratio thereof and outputs the horizontal parabolic amplification signal to secondary coil T12. At this time, transformer T1 matches the impedance between the horizontal parabolic amplification signal and the vertical parabolic amplification signal output from second amplifying section 82. The horizontal parabolic amplification signal output from secondary coil T12 of transformer T1 is applied to second coupling capacitor C12.

Next, when vertical parabolic signal 41 generated from V/H oscillation signal generating section 40 is applied to the emitter terminal of fourth amplifier Q4 through input resistor R19, the vertical parabolic amplification signal which is amplified according to a signal amplifying efficiency of fourth amplifier Q4 is output through the collector terminal of fourth amplifier Q4.

The vertical parabolic amplification signal output from the collector terminal of fourth amplifier Q4 is mixed with the horizontal parabolic amplification signal output from second coupling capacitor C12 and is applied to third grid G3.

In the dynamic focusing system of the monitor system according to the present invention, the vertical and horizontal parabolic signals are amplified by the amplifying sections of the dynamic focusing circuit section, respectively. The vertical and horizontal parabolic signals amplified by the amplifying sections are mixed by the transformer and are applied to the grid.

Accordingly, delay and distortion of the signal caused by the stray-capacitance of the transformer does not occur. Also, the waveform of the dynamic focusing signal is stably maintained even though the user changes a vertical or a horizontal size of the screen of the monitor system. As a result, it is able to easily and correctly compensate the defocusing of the video displayed on the CRT.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A dynamic focusing circuit of a monitor system, said dynamic focusing circuit comprising:
   oscillation signal generator for generating horizontal and vertical parabolic signals in response to a reference oscillation signal;
   a first amplifier for generating an amplified horizontal parabolic signal by amplifying said horizontal parabolic signal, wherein said first amplifier comprises:
   a first NPN type transistor having a base for receiving said horizontal parabolic signal through a first resistor, an emitter coupled to a ground terminal and a collector coupled to said driving power source;
   a second resistor coupled between said base and said collector; and
   a third resistor coupled between said base and said ground terminal;
   a second amplifier for generating a first amplification signal by amplifying the amplified horizontal parabolic signal;
   a driving power source for providing a bias voltage to said first and second amplifiers;
   a third amplifier for amplifying the vertical parabolic signal from said oscillation signal generator and outputting a second amplification signal; and
   a signal mixer for mixing the first and second amplification signals and outputting a dynamic focusing signal.

2. The dynamic focusing circuit as set forth in claim 1, wherein said second amplifier comprises a push-pull amplifier.

3. The dynamic focusing circuit as set forth in claim 1, wherein said third amplifier comprises:
   a voltage divider for producing a divided voltage by dividing a high voltage source;
   a NPN type transistor having a base coupled to said voltage divider for receiving said divided voltage, an emitter for receiving said vertical parabolic signal through a first resistor and a collector for outputting said second amplification signal to said signal mixer; and
   a second resistor coupled between said collector and said high voltage source.

4. The dynamic focusing circuit as set forth in claim 3, wherein said voltage divider comprises:
   a node connected to said base;
   a third resistor coupled between said high voltage source and said node; and
   a fourth resistor coupled between said node and a ground terminal.

5. The dynamic focusing circuit as set forth in claim 1, wherein said signal mixer comprises:
   a first filter for filtering a direct-current component of the first amplification signal;
   a transformer for matching an impedance value of the first amplification signal from said first filter to an impedance value of the second amplification signal; and
   a second filter for filtering the direct-current component of the first amplification signal from said transformer.

6. The dynamic focusing circuit as set forth in claim 5, wherein said first and second filters each comprise a respective coupling capacitor.

7. The dynamic focusing circuit as set forth in claim 1, wherein said driving power source comprises:
   a high voltage source coupled to a first node through a fourth resistor;
   a fifth resistor coupled between said first node and a second node;
   a first diode having an anode connected to said second node and a cathode connected to an anode of a second diode, said second diode having a cathode connected to said collector; and
   a smoothing capacitor coupled between said first node and said ground terminal.

8. The dynamic focusing circuit as set forth in claim 7, wherein said second amplifier comprises a push-pull amplifier.

9. The dynamic focusing circuit as set forth in claim 8, wherein said push-pull amplifier comprises:
   a second NPN type transistor having a base coupled to said second node, a collector coupled to said first node and an emitter; and a PNP type transistor having a base coupled to said collector of said first NPN type transistor for receiving said amplified horizontal parabolic signal, a collector coupled to said ground terminal and an emitter coupled to said emitter of said second NPN type transistor through a sixth resistor.

10. The dynamic focusing circuit as set forth in claim 9, wherein said third amplifier comprises:

a voltage divider for producing a divided voltage by dividing said high voltage source;

a third NPN type transistor having a base coupled to said voltage divider for receiving said divided voltage, an emitter for receiving said vertical parabolic signal through a seventh resistor and a collector for outputting said second amplification signal to said signal mixer; and an eighth resistor coupled between said collector of said third NPN type transistor and said high voltage source.

11. The dynamic focusing circuit as set forth in claim 10, wherein said voltage divider comprises:

a third node connected to said base of said third NPN type transistor;

a ninth resistor coupled between said high voltage source and said third node; and a tenth resistor coupled between said third node and a ground terminal.

12. The dynamic focusing circuit as set forth in claim 11, wherein said signal mixer comprises:

a first coupling capacitor coupled between said collector of said second NPN type transistor and a first terminal of an eleventh resistor;

a transformer having a first coil connected between a second terminal of said eleventh resistor and said ground terminal, and a second coil;

a fourth node from which said dynamic focusing signal is output; and a second coupling capacitor having one terminal connected at said fourth node to said collector of said third NPN type transistor and having another terminal connected to said second coil, said second coil being further connected to said ground terminal.

13. A dynamic focusing circuit of a monitor system, said dynamic focusing circuit comprising:

oscillation signal generator for generating horizontal and vertical parabolic signals in response to a reference oscillation signal;

a first amplifier for generating an amplified horizontal parabolic signal by amplifying said horizontal parabolic signal;

a high voltage source coupled to a first node through a first resistor;

a second resistor coupled between said first node and a second node;

a pair of diodes coupled in series, an anode of a first one of said diodes being connected to said second node and a cathode of said first one of said diodes being connected to an anode of a second one of said diodes, said second one of said diodes having a cathode connected to an output terminal of said first amplifier at a third node;

a smoothing capacitor coupled between said first node and a ground terminal;

a second amplifier having a first input terminal connected to said second node and a second input terminal connected to said third node, wherein said second amplifier generates a first amplification signal by amplifying the amplified horizontal parabolic signal;

a third amplifier for amplifying the vertical parabolic signal from said oscillation signal generator and outputting a second amplification signal; and a signal mixer for mixing the first and second amplification signals and outputting a dynamic focusing signal.

14. The dynamic focusing circuit as set forth in claim 13, wherein said second amplifier comprises a push-pull amplifier.

15. The dynamic focusing circuit as set forth in claim 14, wherein said push-pull amplifier comprises:

a NPN type transistor having a base coupled to said second node, a collector coupled to said first node and an emitter coupled to said signal mixer at a fourth node;

a PNP type transistor having a base coupled to said third node for receiving said amplified horizontal parabolic signal, a collector coupled to said ground terminal and an emitter coupled to said signal mixer via said fourth node; and a third resistor coupled between said fourth node and said emitter of said PNP type transistor.

16. The dynamic focusing circuit as set forth in claim 15, wherein said signal mixer comprises:

a first coupling capacitor having one terminal connected to said fourth node, to receive said first amplification signal, and having another terminal connected to a first terminal of a fourth resistor;

a transformer having a first coil connected between a second terminal of said fourth resistor and said ground terminal, and a second coil connected to said ground terminal;

a fifth node from which said dynamic focusing signal is output; and a second coupling capacitor having one terminal connected at said fifth node to an output terminal of said third amplifier, to receive said second amplification signal, and having another terminal connected to said second coil.

17. The dynamic focusing circuit as set forth in claim 13, wherein said signal mixer comprises:

a first coupling capacitor having one terminal connected to an output terminal of said second amplifier to receive said first amplification signal and having another terminal connected to a first terminal of a third resistor;

a transformer having a first coil connected between a second terminal of said third resistor and said ground terminal, and a second coil connected to said ground terminal;

a fourth node from which said dynamic focusing signal is output; and a second coupling capacitor having one terminal connected at said fourth node to an output terminal of said third amplifier to receive said second amplification signal and having another terminal connected to said second coil.

18. A dynamic focusing circuit of a monitor system, said dynamic focusing circuit comprising:

oscillation signal generator for generating horizontal and vertical parabolic signals in response to a reference oscillation signal;

a first amplifier for generating an amplified horizontal parabolic signal by amplifying said horizontal parabolic signal;

a second amplifier for generating a first amplification signal by amplifying the amplified horizontal parabolic signal;

a driving power source for providing a bias voltage to said first and second amplifiers;

a third amplifier for amplifying the vertical parabolic signal from said oscillation signal generator and outputting a second amplification signal; and a signal mixer for mixing the first and second amplification signals and outputting a dynamic focusing signal, wherein said signal mixer comprises:

a first coupling capacitor having one terminal connected to an output terminal of said second amplifier, to receive said first amplification signal, and having another terminal connected to a first terminal of a first resistor;

a transformer having a first coil connected between a second terminal of said first resistor and a ground terminal, and a second coil connected to said ground terminal;

a node from which said dynamic focusing signal is output; and a second coupling capacitor having one terminal connected at said node to an output terminal of said third amplifier, to receive said second amplification signal, and having another terminal connected to said second coil.

19. The dynamic focusing circuit as set forth in claim 18, wherein said driving power source comprises:

a high voltage source coupled to a second node through a second resistor;

a third resistor coupled between said second node and a third node;

a first diode having an anode connected to said third node and a cathode connected to an anode of a second diode, said second diode having a cathode connected to a fourth node; and a smoothing capacitor coupled between said second node and said ground terminal.

20. The dynamic focusing circuit as set forth in claim 19, wherein said second amplifier comprises:

a NPN type transistor having a base coupled to said third node, a collector coupled to said second node and an emitter coupled to said one terminal of said first coupling capacitor; and a PNP type transistor having a base coupled to an output terminal of said first amplifier, for receiving said amplified horizontal parabolic signal, a collector coupled to said ground terminal and an emitter coupled to said emitter of said NPN type transistor through a fourth resistor.

21. The dynamic focusing circuit as set forth in claim 18, wherein said second amplifier comprises:

a NPN type transistor having a collector coupled to said driving power source at a second node, a base coupled to said driving power source at a third node, and an emitter coupled to said one terminal of said first coupling capacitor; and a PNP type transistor having a base coupled to an output terminal of said first amplifier, for receiving said amplified horizontal parabolic signal, a collector coupled to said ground terminal and an emitter coupled to said emitter of said NPN type transistor through a second resistor.

22. The dynamic focusing circuit as set forth in claim 21, wherein said driving power source comprises:

a high voltage source coupled to said second node through a third resistor;

a fourth resistor coupled between said second node and said third node;

a first diode having an anode connected to said third node and a cathode connected to an anode of a second diode, said second diode having a cathode connected to said output terminal of said first amplifier; and a smoothing capacitor coupled between said second node and said ground terminal.

\* \* \* \* \*